(12) United States Patent
Yu

(10) Patent No.: US 10,890,732 B2
(45) Date of Patent: Jan. 12, 2021

(54) LENS, LENS HOLDER COMPONENT AND STROBE LAMP

(71) Applicant: NINGBO VASA INTELLIGENT TECHNOLOGY CO., LTD., Ningbo (CN)

(72) Inventor: Feng Yu, Ningbo (CN)

(73) Assignee: NINGBO VASA INTELLIGENT TECHNOLOGY CO., LTD., Ningbo (CN)

( * ) Notice: Subject to any disclaimer, the term of this patent is extended or adjusted under 35 U.S.C. 154(b) by 340 days.

(21) Appl. No.: 16/102,013

(22) Filed: Aug. 13, 2018

(65) Prior Publication Data
US 2019/0204529 A1    Jul. 4, 2019

(30) Foreign Application Priority Data

Jan. 4, 2018   (CN) .......................... 2018 1 0007956
Jan. 4, 2018   (CN) ..................... 2018 2 0013133 U

(51) Int. Cl.
*G02B 7/02*   (2006.01)
*F21V 5/00*   (2018.01)
(Continued)

(52) U.S. Cl.
CPC .............. *G02B 7/022* (2013.01); *F21V 5/006* (2013.01); *F21V 5/007* (2013.01); *F21V 5/04* (2013.01);
(Continued)

(58) Field of Classification Search
CPC .......... G02B 7/02; G02B 7/021; G02B 7/026; G02B 7/025; G02B 7/022; G02B 7/023; G02B 7/003; G02B 7/08; G02B 13/001; G02B 13/0085; G02B 7/04; G02B 23/2476; G02B 3/00; G02B 7/102; G02B 13/003; G02B 27/0018; G02B 27/62; G02B 7/004; G02B 13/0035; G02B 13/006; G02B 13/18; G02B 25/002; G02B 27/0006; G02B 27/0025; G02B 3/0062; G02B 3/0075; G02B 5/003; G02B 7/10; G02B 7/14;
(Continued)

(56) References Cited

U.S. PATENT DOCUMENTS

| | | | |
|---|---|---|---|
| 2020/0215754 A1* | 7/2020 | Ootorii | .................. B33Y 30/00 |
| 2020/0233293 A1* | 7/2020 | Wei | ......................... G02B 7/021 |
| 2020/0259307 A1* | 8/2020 | Sharma | .................. H01S 5/026 |

\* cited by examiner

*Primary Examiner* — Collin X Beatty
*Assistant Examiner* — Grant A Gagnon
(74) *Attorney, Agent, or Firm* — Charles C. Achkar; Ostrolenk Faber LLP.

(57) ABSTRACT

A lens is provided. The lens comprises a lens body. The lens body is substantially in a shape of a circular table. A small end of the lens body is provided with a concave inner light source accommodation space. The inner surface of the light source accommodation space is an incident surface of light. A surface of a large end of the lens body is an exit surface, and a side surface of the lens body is a reflecting surface. A bottom of the light source accommodation space is provided with a cylindrical protrusion. A cross section dimension of the light source accommodation space gradually decreases, from the small end of the lens to the large end of the lens. The cylindrical protrusion is formed by protrusion from the bottom of the light source accommodation space toward the small end of the lens body.

15 Claims, 20 Drawing Sheets

(51) Int. Cl.
  *F21V 5/04* (2006.01)
  *F21V 7/00* (2006.01)
  *G02B 19/00* (2006.01)
  *F21V 17/16* (2006.01)
  *F21Y 115/10* (2016.01)
  *G02B 3/00* (2006.01)

(52) U.S. Cl.
  CPC ............ *F21V 5/045* (2013.01); *F21V 7/0091* (2013.01); *F21V 17/164* (2013.01); *G02B 19/0028* (2013.01); *G02B 19/0061* (2013.01); *F21Y 2115/10* (2016.08); *G02B 3/005* (2013.01)

(58) Field of Classification Search
  CPC .... G02B 7/1825; G02B 9/12; G02B 13/0025; G02B 13/004; G02B 13/146; G02B 19/0076; G02B 21/33; G02B 23/12; G02B 23/16; G02B 23/2423; G02B 23/243; G02B 23/2446; G02B 23/2492; G02B 23/26; G02B 25/005; G02B 25/008; G02B 26/124; G02B 26/125; G02B 27/646; G02B 3/0018; G02B 3/0056; G02B 3/0068; G02B 3/0081; G02B 3/0087; G02B 5/005; G02B 6/32; G02B 6/3652; G02B 6/3656; G02B 6/3829; G02B 6/3853; G02B 6/3885; G02B 6/4214; G02B 6/4225; G02B 6/4226; G02B 6/4237; G02B 6/4249; G02B 6/43; G02B 7/00; G02B 7/001; G02B 7/105; F21V 33/0068
  USPC ........................................................ 359/819
  See application file for complete search history.

LENS, LENS HOLDER COMPONENT AND STROBE LAMP

CROSS REFERENCE TO RELATED APPLICATIONS

The present application claims priority to Chinese Application No. 201810007956.2, filed on Jan. 4, 2018 and Chinese Application No. 201820013133.6 filed Jan. 4, 2018, the subject matter of each of which are incorporated herein by reference in their entirety.

TECHNICAL FIELD

The present invention relates to the field of lighting, and specifically, the present invention relates to a lens, a lens holder, and a strobe lamp.

BACKGROUND

With the improvement of people's living standards, many people own their own cars, which increases the number of vehicles driving on the road and increases the risk of driving. Therefore, the safety of driving is getting more and more attention. The use of strobe lamps with warning and decorative functions has been welcomed by a large number of users. And strobe lamps need be installed on heavy vehicles such as fire engines, trucks, and ambulances.

At present, a conventional strobe lamp generally includes a base, a light barrier connected to the base and having an opening at one end, and one or more LED light groups disposed at the opening of the light barrier. The LED light group includes a lampshade, a circuit board, the LED lights welded on the circuit board and a lens disposed on the top of the inner cavity of the lampshade and integrated with the light cover. The lampshade is connected to the base. And the circuit board is connected with the base. Although the strobe lamp with the above structure is simple in structure, since the lampshade and the lens are integral, when the user wants to achieve different transmission effects by replacing the lens, the lampshade and the lens must be replaced together. Thereby it gives the user increased unnecessary replacement costs. And the lens has large volume in the market. Usually a plurality of lenses need be integrally disposed, therefore the replacement cost is high.

In addition, the installation stability of the lens on the strobe lamp is not high. Usually the lens is disposed in the mounting slot of the mounting frame, and the cover is installed on the upper part of the mounting slot to prevent the lens from falling out of the mounting slot. But the stability of the lens is not stable, the lens will have vibration in the mounting slot and produce abnormal noise, which affects the quality of the product, and results in much parts and high cost.

SUMMARY

The main technical problem to be solved by the present invention is to provide a lens which is small in size, and convenient to replace. It can meet different lighting demand, can reach an illumination angle of 20*40 degrees. And it meets R65 certification and achieves an ultra-large angle of 180 degrees, and meets the laws and regulations regulated by various countries and reduce manufacturing and replacement costs.

According to a first aspect of the invention, a lens is provided. The lens comprises a lens body. The lens body is substantially in a shape of a circular table. A small end of the lens body is provided with a concave inner light source accommodation space. The inner surface of the light source accommodation space is an incident surface of light. A surface of a large end of the lens body is an exit surface, and a side surface of the lens body is a reflecting surface. A bottom of the light source accommodation space is provided with a cylindrical protrusion. A cross section dimension of the light source accommodation space gradually decreases, from the small end of the lens to the large end of the lens. The cylindrical protrusion is formed by protrusion from the bottom of the light source accommodation space toward the small end of the lens body.

Optionally, a spherical protrusion is symmetrically disposed at both ends of the cylindrical protrusion in the axial direction, and the surface of cylindrical protrusion is transitionally connected with the surface of the spherical projection.

According to the above technical solution, a plurality of different illumination lenses can be designed and manufactured, which are based the above lens structure. For example, the illumination angle of 20*40 degrees can be achieved, so as to meet the European R65 certification and the lighting standards regulated by the US SAE and T13 and other national regulations. The effect of an ultra-large angle of 180 degrees also can be achieved. And the lens is small in size, with low manufacturing costs. And it is easy to replace, saving replacement costs. For example, users can install a lens with small size and same profile in the same lens holder, to achieve different lighting demand without designing and manufacturing a plurality of lens holders. Users does not need purchase a plurality of lens holders to achieve different lighting effects, thereby reducing design and manufacturing costs and replacement costs.

Optionally, a surface of the large end of the lens body is provided with a ridge.

According to the above technical solution, the large end of the lens body, i.e., the exit surface, is provided with a ridge. The exit surface matches with the incident surface and the reflection surface, so that the light emitted from the exit surface of the lens meets the European R65 certification standard and the lighting demand of the US SAE and T13.

Optionally, a stepped notch is disposed between one side of the large end of the lens body and the side of the lens body. The stepped notch is formed by invagination from the outside of the lens to the solid part of the lens, and comprises a continuous first plane, a second plane, a third plane and a fourth plane. The first plane, the second plane, the third plane, and the fourth plane are disposed in a direction from the surface of the large end of the lens body to the side of the lens body in sequence. The first plane intersects the second plane to form a first notch; the third plane intersects the fourth plane to form a second notch. The first notch and the second notch constitute the stepped notch; the first plane is perpendicular or nearly perpendicular to the surface of the large end of the lens.

According to the above technical solution, a stepped outlet is disposed on the large end side of the lens body, i.e., one side of the exit surface. The exit surface matches with the incident surface and the reflective surface of the lens. From the side of the lens, the light emitted from the stepped outlet of the lens can be seen, increasing the exit angle of the light and reaching a light angle of 180 degrees.

Optionally, the surface of the large end of the lens body is a concave inner smooth surface.

According to the above technical solution, the surface of the large end of the lens body, i.e., the exit surface is a concave smooth surface, which matches with the incident surface and the reflective surface of the lens. And the light emitted from the lens exit surface can reach an illumination angle of 20*40 degrees, and can achieve 20 degree up and down, 40 degrees left and right of light range.

Optionally, an edge of the large end of the lens body is provided with a clamp slot.

According to the above solution, the clamp slot is provided so that matching holder can be fixed and clamped.

Another technical problem to be solved by the present invention is to provide a lens and a lens holder component, which have a simple structure and fewer parts, so as to improve the installation stability of the lens, and eliminate abnormal noise.

According to a second aspect of the invention, a lens and lens holder component is provided. The component comprises a lens holder and a lens. The lens comprises a lens body. The lens body is substantially in a shape of a circular table, and the small end of the lens body is provided with a concave inner light source accommodation space. The inner surface of the light source accommodation space is an incident surface of light. The surface of the large end of the lens body is an exit surface. The side of the lens body is a reflective surface, and bottom of the light source accommodation space is provided with a cylindrical protrusion. Cross section dimension of the light source accommodation space gradually decreases from the small end of the lens body to the large end of the lens body, and an edge of large end of the lens body is provided with a clamp slot. The lens holder comprises an elastically deformable frame body, and an accommodation cavity for accommodating the lens is disposed on the frame body, and the side wall of the accommodation cavity near an opening is provided with a clamp block which clamps with the clamp slot. The clamp block can be elastically extended and retracted into the inner wall of the accommodation cavity, and the bottom of the accommodation cavity is provided with a perforation to pass through the small end of the lens body.

The specific structure of the perforation can be: the lens is higher than the bottom of the holder by 0.1 mm. The structure can make the lens evenly press the circuit board after the screw is fixed, so that the circuit board and the aluminum part attach smoothly, which makes heat be dissipated more evenly.

According to the above technical solution, the lens is installed in the accommodation cavity. The upper part is clamped by the matching of the clamp block and the clamp slot to prevent the lens from falling out of the accommodation cavity. The cover plate is eliminated, the structure is simplified, and the cost is reduced. Furthermore, it is convenient to disassemble and assemble.

The small end of the lens protrudes through the perforation of the accommodation cavity to facilitate abutment with the lamp plate. Furthermore the large end of the lens is clamped with the clamp block, thereby realizing the locking of the lens in the vertical direction, improving the installation stability of the lens, and eliminating the abnormal sound. The clamp block can be elastically extended and retracted into the inner wall of the accommodation cavity to facilitate disassembly and assembly of the lens. Furthermore, a plurality of lenses having the same outer profile and different optical performance can be disposed in the accommodation cavity, thereby reducing the manufacturing cost and being adaptable without designing and manufacturing a plurality of lens holders. Users do not need purchase a plurality of different lens holders to achieve different lighting effects, thereby reducing design and manufacturing costs and replacement costs.

Optionally, a deformation slot is disposed on the frame body along deformation direction of the clamp block and adjacent to the clamp block.

According to the above technical solution, the arrangement of the deformation slot improves the elastic deformation ability of the clamp block. Specifically, when the lens is mounted, the clamp block will be subject to the lateral pressure of the side of the lens in the process of the lens moving downwards in the accommodation cavity. The arrangement of the deformation slot makes the clamp block be more easily deformed laterally. When the clamp slot of the lens and the clamp block are on the same horizontal level, the clamp block is no longer subjected to the extrusion force from the side of the lens. Under the action of the restoring force, the clamp block deforms back to the initial position laterally and clamps into the clamp slot.

Optionally, the accommodation cavity is formed by at least two bracket plates spaced apart, which matches with the profile of the sidewall of the lens gradually.

According to the above technical solution, the arrangement of the bracket plates plays a role of supporting the lens side wall. It avoids horizontal shaking of the lens, improves the installation stability of the lens, and locates the lens. Furthermore, it can facilitate disassembly. In addition, the wall thickness of the bracket plates is 1.2 mm, which plays a role in the deformation. During installation of the lens, the side of the lens extrude the bracket plates to deform and distract the bracket plates until the clamp block is clamped in the clamp slot in the process of the lens moving downward in the accommodation cavity, so that the side of the lens and the large end in which the clamp slot is disposed, are subjected to pressure, thereby improving the installation stability of the lens.

In certain embodiments, the accommodation cavity is formed by at least two bracket plates spaced apart, which matches with the profile of the sidewall of the lens gradually. "Gradual matching" means that the profile of the sidewall of the lens and the bracket plates are in complete contact at the bottom near the small end of the lens body, and there is a gap in the upper part near the large end of the lens body. The purpose of the "gradual matching" structure is to prevent deformation amount of the lens holder from being too small to be installed or not easy to install in the process of lens installation.

Optionally, a stepped notch is disposed between one side of the large end of the lens body and the side of the lens body. The accommodation cavity comprises a first cavity and a second cavity. The first cavity is disposed at both ends of the frame body and matches with the stepped notch. The second cavity is disposed in middle of the frame body.

According to the above technical solution, a lens with a stepped notch is mounted in the first cavity, which is disposed at both ends of the lens holder. The light emitted from the lens can be seen from both sides of the lens holder, achieving an illumination range of 180 degrees, and has good warning effect.

Another technical problem to be solved by the present invention is to provide a strobe lamp, which has low manufacturing cost and strong adaptability.

According to a third aspect of the present invention, a strobe lamp is provided. The strobe lamp comprises a base, a transparent cover and a lamp plate which are fastened together. The strobe lamp further comprises the above lens and the lens holder component. The lamp plate locates between the base and the frame body. The frame body and the lamp plate are fastened to the base with fasteners. Bottom of the lens body abuts on the lamp plate, and the transparent cover is covered on periphery of the frame body.

According to the above technical solution, the strobe lamp adopts a lens holder, which can install lenses with different optical performance to achieve different lighting effects, and meet different lighting standards. It has a good adaptability, simplifies the structure. And it has a low cost, and is convenient to disassemble and assemble;

The strobe lamp matching with lamp plate can achieve a variety of functions, such as warnings, lighting functions, and the STT function of the car. The bottom end of the lens body i.e., the small end is abutted on the lamp plate. The upper part of the lens body i.e., the clamp slot of the large end and the clamp block on the lens holder are clamped and fixed, further improving the stability of the lens installation, avoiding the noise generated by the lens impacting holder, and improving the quality of the lamps.

In summary, the beneficial effects of the present invention are:

(1) The structure is simple, cost-effective and durable. It is expected that after being launched, it will replace existing products and have a good market prospect.

(2) The lens with a stepped notch is mounted on the end of the lens holder to achieve a wide-angle illumination of 180 degrees, and the warning effect is good.

(3) By the fitting clamp of the clamp block and the clamp slot replaces the fixation of the cover plate to the lens, which simplifies the structure, it has high installation stability of the lens, low cost, convenient disassembly and assembly. The bottom of the lens holder is open, and the bottom of the lens is extended to contact with the lamp plate, the fixation effect is good, avoiding product vibration and abnormal sound.

(4) The size of the lens is small and replacement cost is low.

(5) The design of the lens can be the same as the external profile and mounted in the same accommodation slot of the same mounting holder to achieve different performance and save manufacturing and R&D costs.

Figure 1:
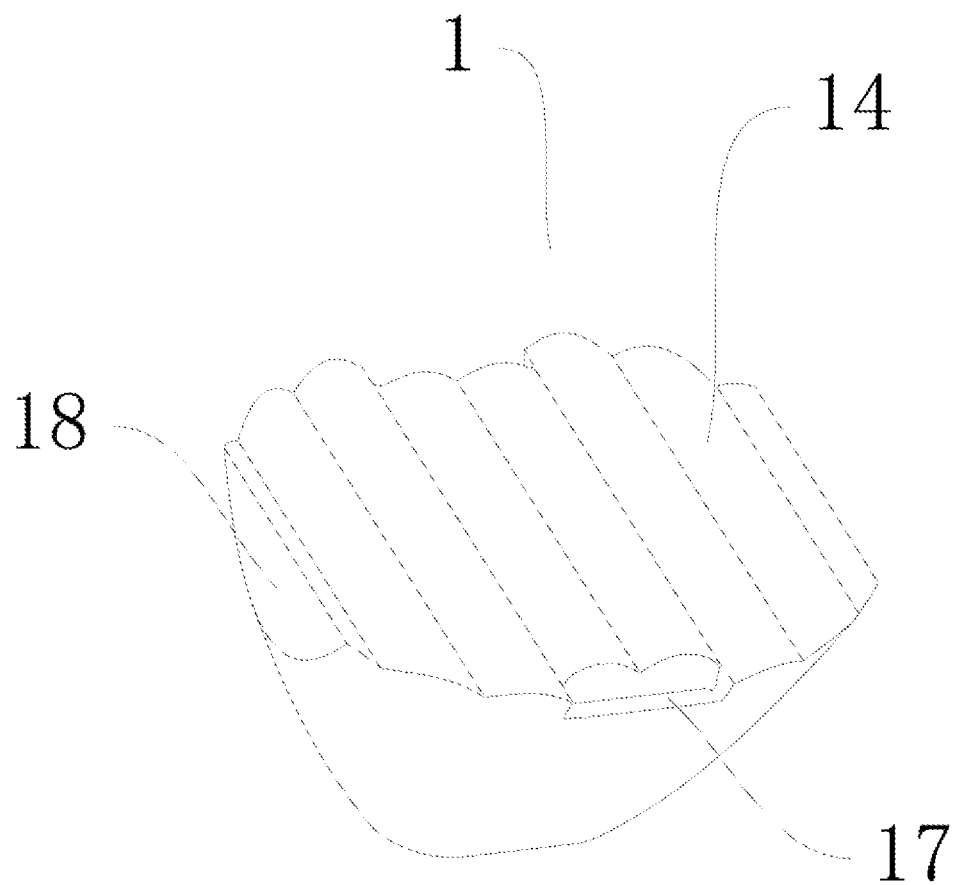
FIG. 1 is a perspective view of a lens with a ridge of a first embodiment.

In the figure, the names of the parts corresponding to the respective reference numerals are: 1: lens body; 11: light source accommodation space; 12: cylindrical protrusion; 13: spherical protrusion; 14: ridge; 15, inner concave smooth surface; 16, stepped notch; 17, clamp slot; 18, vertical section; 2, frame body; 21, a first cavity; 22, a second cavity; 23, clamp block; 24, deformation slot; 25: perforation; 26: bracket plate; 27: mounting holes; 3: strobe lamps; 31: base; 32: transparent cover; 321: mounting plate; 322: decorative patterns; 33: lamp plate; 331: lamp beads; 332: via holes; 34: chrome-coated decorative parts; 35: sealing slot; 36, screw holes;

I—first plane, II—second plane, III—third plane, IV—fourth plane.

DETAILED DESCRIPTION

In order to better understand the content of the present invention, further description will be given below with reference to specific embodiment and drawings. It should be understood that these embodiments are only for further explanation of the present invention and are not intended to limit the scope of the present invention. In addition, it should be understood that after reading the contents of the present invention, those skilled in the art make some non-essential changes or adjustments to the present invention and still fall within the protection scope of the present invention.

Embodiment 1

The lens includes a lens body 1. The lens body 1 is substantially in a shape of a circular table. And a light source accommodation space 11 is provided at the small end of the lens body 1. The inner surface of the light source accommodation space 11 is a light incident surface. The surface of the large end of the lens body 1 is an exit surface, and the side surface of the lens body 1 is a reflection surface. The bottom of the light source accommodation space 11 is provided with a cylindrical protrusion 12. A spherical protrusion 13 is provided at the both axial ends of the cylindrical protrusion 12 symmetrically. The surface of the cylindrical protrusion 12 is transitionally connected with the surface of the spherical protrusion 13. The cross section dimension of the light source accommodation space 11 gradually decreases from the small end of the lens body 1 to the large end of the lens body 1. The size of the lens is small. And it can save replacement cost. For example, in the same lens holder, lenses with the same profile and small size can be mounted to achieve different illumination demand. There is no need to design and manufacture a plurality of lens holders. Users who need to achieve different lighting effects also need not purchase a plurality of different lens holders. Therefore, it reduces design and manufacturing costs and replacement costs.

Furthermore, referring to FIGS. 1-5, a plurality of parallel ridges 14 are evenly disposed on the surface of the large end of the lens body 1. The dimension of the bulging height and the width of each ridge 14 is the same, and the axis of the ridge 14 is perpendicular to the axis of the cylindrical protrusion 12. The exit surface, provided with a ridge, matches with the incident surface and the reflection surface of the lens. Therefore the light emitted from the lens exit surface meets the European R65 certification standard and the lighting demand of the US SAE and T13.

Figure 2:
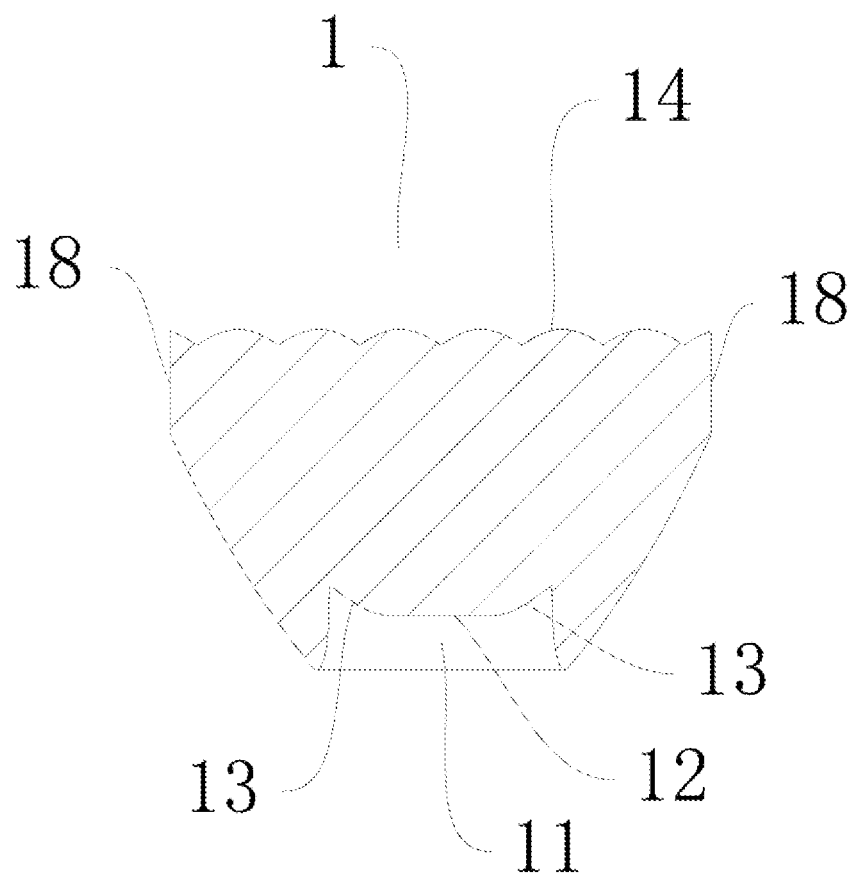
FIG. 2 is a front sectional view of a lens with a ridge of the first embodiment.

FIG. 2 is the front sectional view of the lens in this embodiment. As can be seen from the figure, the upper end of the lens body 1 i.e., the large end is formed by connection of a plurality of convex arcs on the same horizontal level. The two sides of the upper part of the light source accommodation the space 11 are high and the middle is low. The middle is a horizontal straight line, and both ends of the straight line are respectively symmetrically connected to one arc. The side of the light source accommodation space 11 is an arc.

Figure 3:
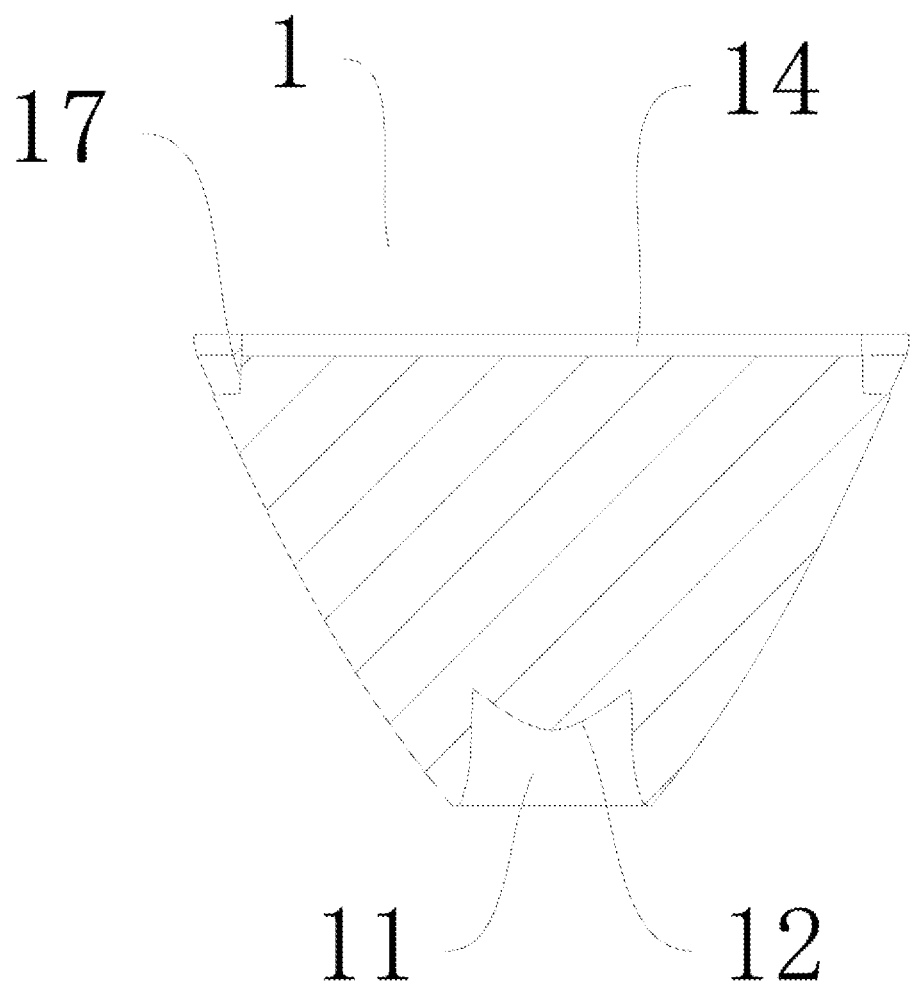
FIG. 3 is a side sectional view of a lens with a ridge of the first embodiment.
Figure 4:
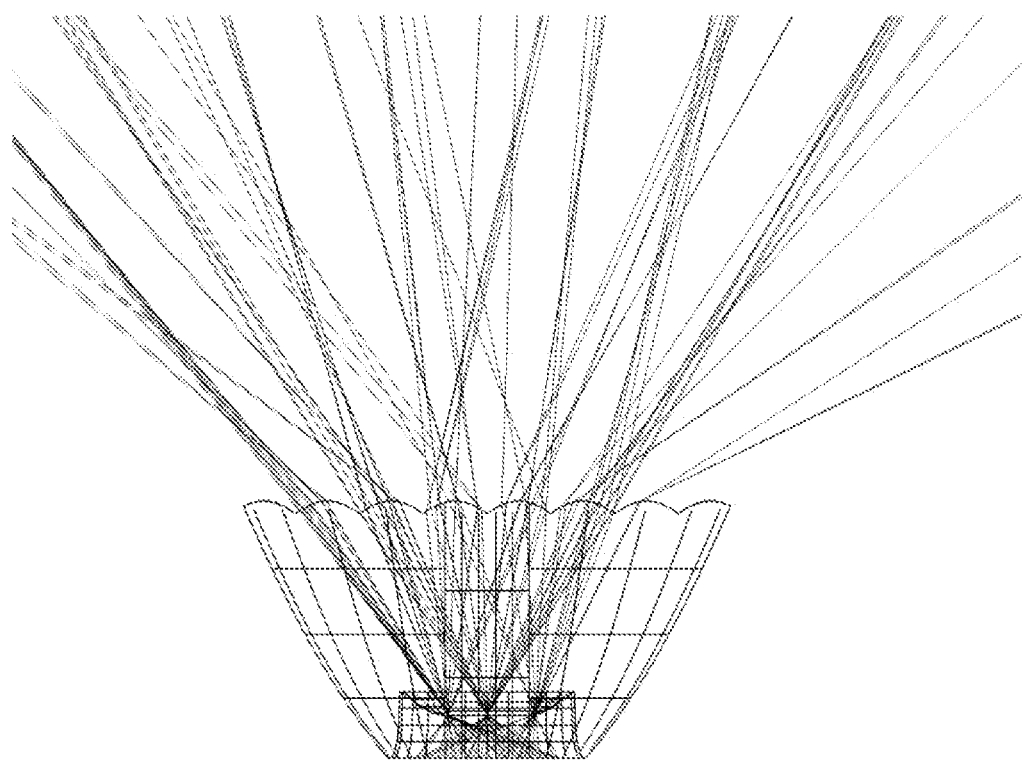
FIG. 4 is a front light path diagram of a lens with a ridge of the first embodiment.
Figure 5:
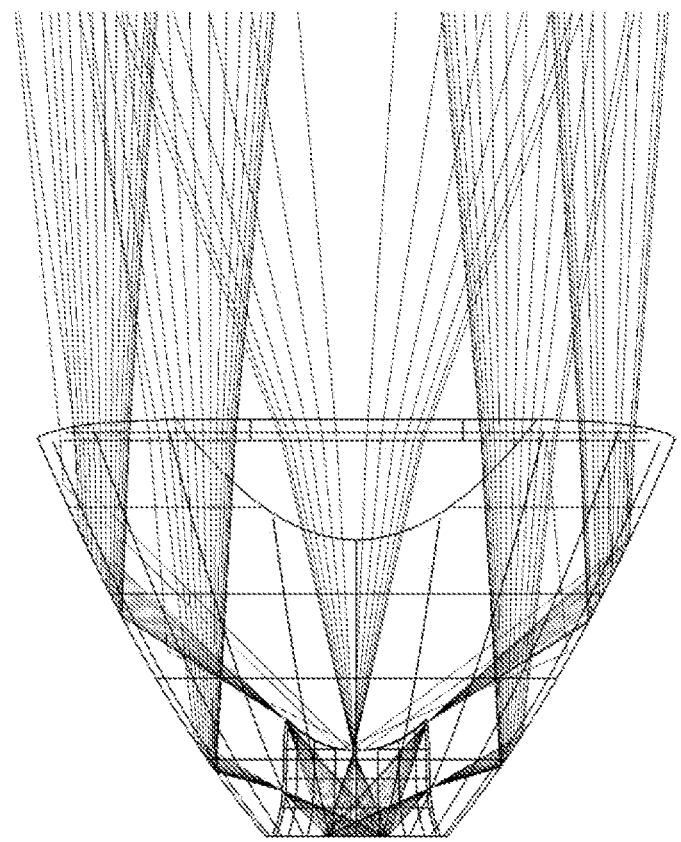
FIG. 5 is a side light path diagram of a lens with a ridge of the first embodiment.
Figure 6:
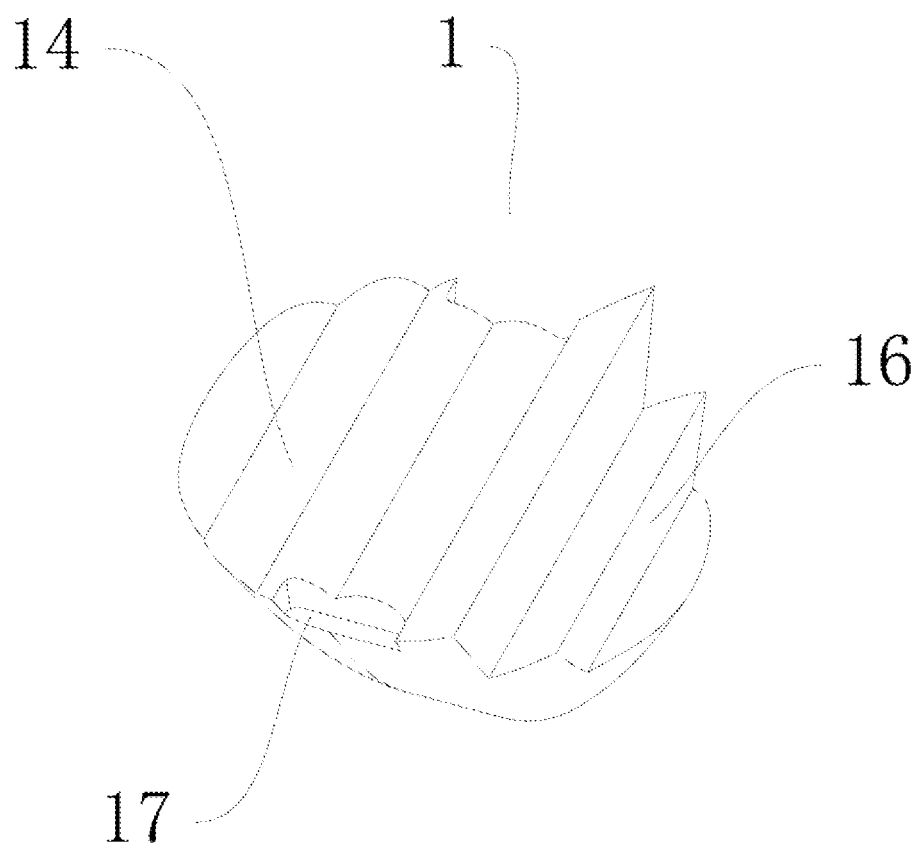
FIG. 6 is a perspective view of a lens with a stepped notch of a second embodiment.

FIG. 3 is the side sectional view of the lens in this embodiment. As can be seen from the figure, the upper end of the lens body 1 i.e., the large end is a horizontal straight line. The upper end of the light source accommodation space 11 is a curve with two sides high and middle low.

On the opposite sides of the large end of the lens body 1, the clamp slot 17 is symmetrically provided without affecting the optical efficiency of the lens, so as to make matching the folders easy be mounted directly. On the other two opposite ends of the lens body 1, vertical sections 18 are symmetrically provided to make the lens more beautiful.

The size of the lens body 1 is 20*19*12 mm. The height of the ridge 14 is 0.6 mm, the width of the ridge is 3 mm. The height of the clamp slot 17 is 1 mm, the width of the clamp slot 17 is 6 mm, and its volume is small.

Embodiment 2

Referring to FIGS. 6-10, the lens includes a lens body 1. The lens body 1 is substantially in a shape of a circular table. The small end of the lens body 1 is provided with a concave inner light source accommodation space 11. The internal surface of the light source accommodation space 11 is the incident surface of light. The surface of the large end of the lens body 1 is an exit surface, and the side surface of the lens body 1 is a reflection surface. A cylindrical protrusion 12 is disposed at the bottom of the light source accommodation space 11. Spherical protrusions 13 are symmetrically disposed at both axial ends of the cylindrical protrusion 12. The surface of the cylindrical protrusion 12 and the surface of the spherical protrusion 13 are transitionally connected. And the cross section dimension of the light source accommodation space 11 gradually decreases from the small end to the large end. The surface of the large end of the lens body 1 is evenly provided with parallel ridges 14. The bulging heights and widths of the ridge 14 are the same, and the axis of the ridge 14 is perpendicular to the axis of the cylindrical protrusion 12.

The difference from the first embodiment is that a stepped notch 16 is provided between the large end of the lens body 1 and the side of the lens body 1. Matching with the incident surface and the reflective surface of the lens, the light emitted from the stepped notch 16 of the lens can be seen from the side of the lens. It increases the exit angle of the light. And the stepped notch 16 can be installed at the end of the lamp, so that the lamp can reach 180 degrees beam angle.

The stepped notch is formed by the invagination from the outside of the lens to the solid portion of the lens, which includes a continuous first plane, a second plane, a third plane, and a fourth plane. And the first plane I, the second plane II, The third plane III and the fourth plane IV are sequentially arranged from the surface of the large end of the lens body 1 to the side surface of the lens body 1. The first plane intersects with the second plane to form a first notch, the third plane intersects with the fourth plane to form a second notch. The first notch and the second notch constitute the stepped notch. The first plane is perpendicular or nearly perpendicular to the surface of the large end of the lens body.

Figure 7:
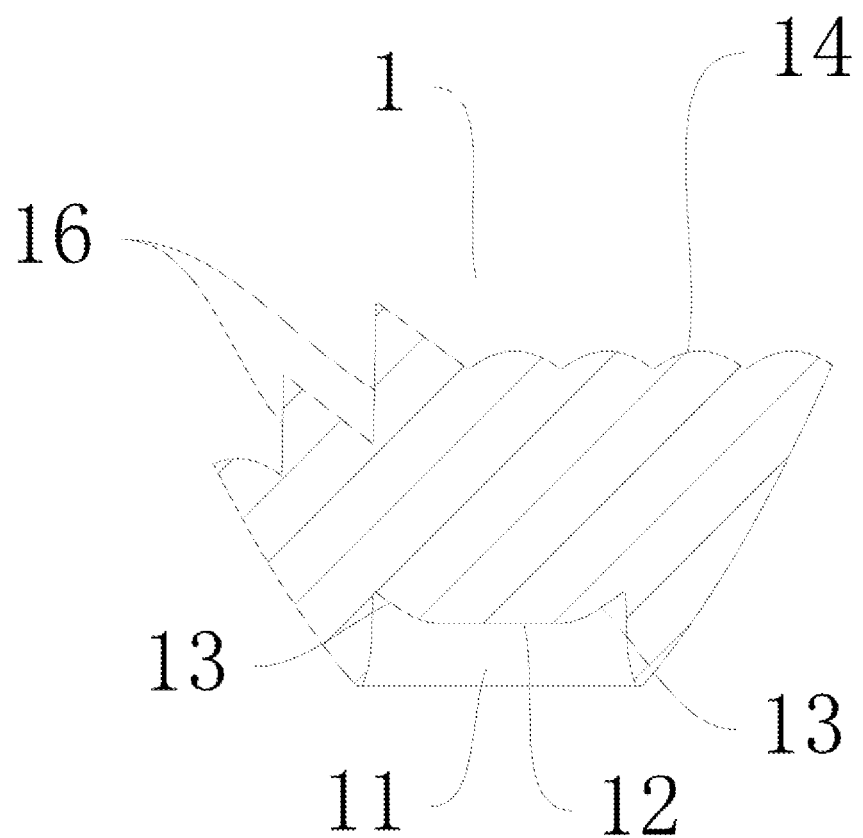
FIG. 7 is a front sectional view of a lens with a stepped notch of the second embodiment.

FIG. 7 is the front sectional view of the lens of this embodiment. It can be seen from the figure that the large end of the lens body 1 is formed by horizontal connection of several same convex arcs. The left side of the convex arc is connected with two stepped broken lines. The two sides of the upper end of the light source accommodation space 11 are high and the middle is low, and the middle is a horizontal straight line. Both ends of the straight line are symmetrically connected to one arc. The sides of the light source accommodation space 11 are arcs.

Figure 8:
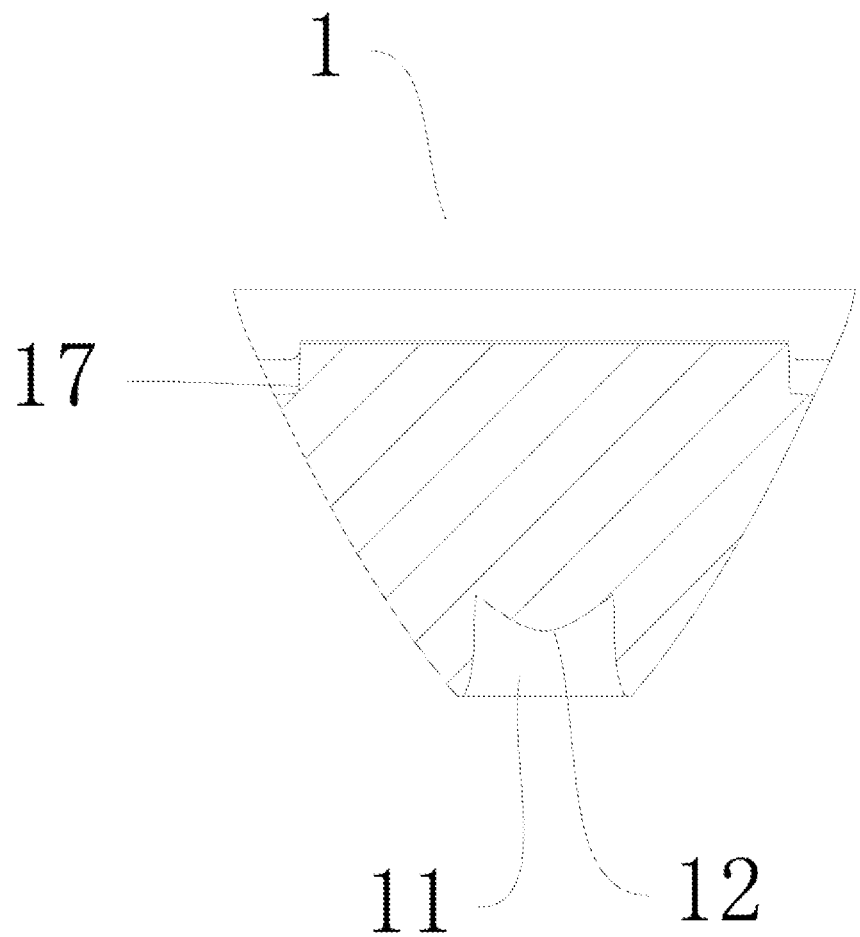
FIG. 8 is a side sectional view of a lens with a stepped notch of the second embodiment.
Figure 9:
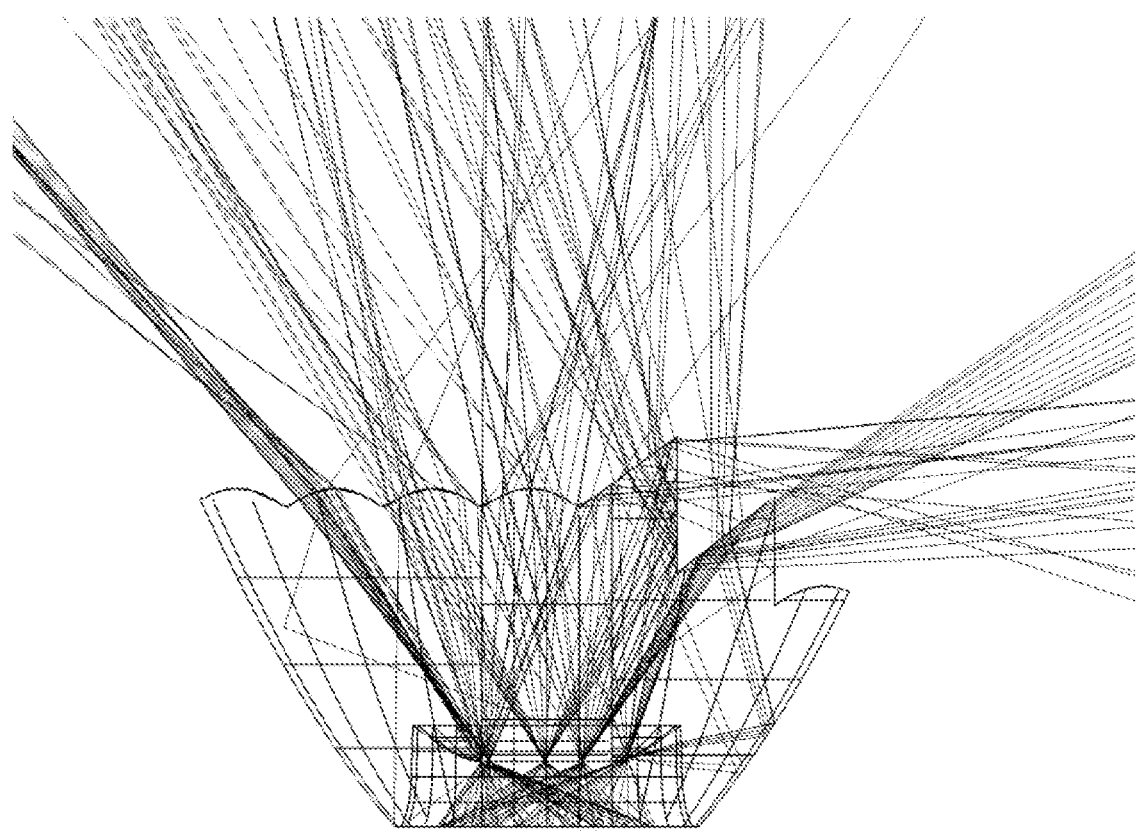
FIG. 9 is a front light path diagram of a stepped notch of the second embodiment.
Figure 10:
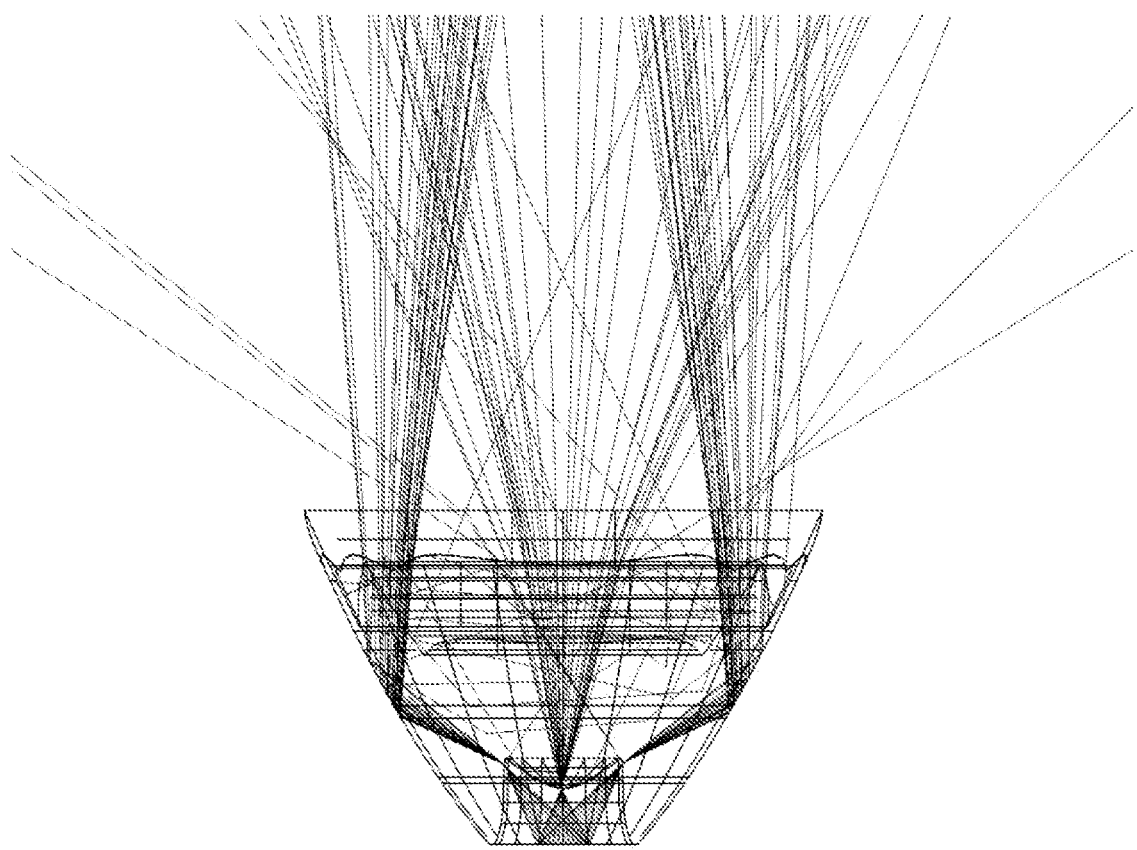
FIG. 10 is a side light path diagram of a stepped notch of the second embodiment.
Figure 11:
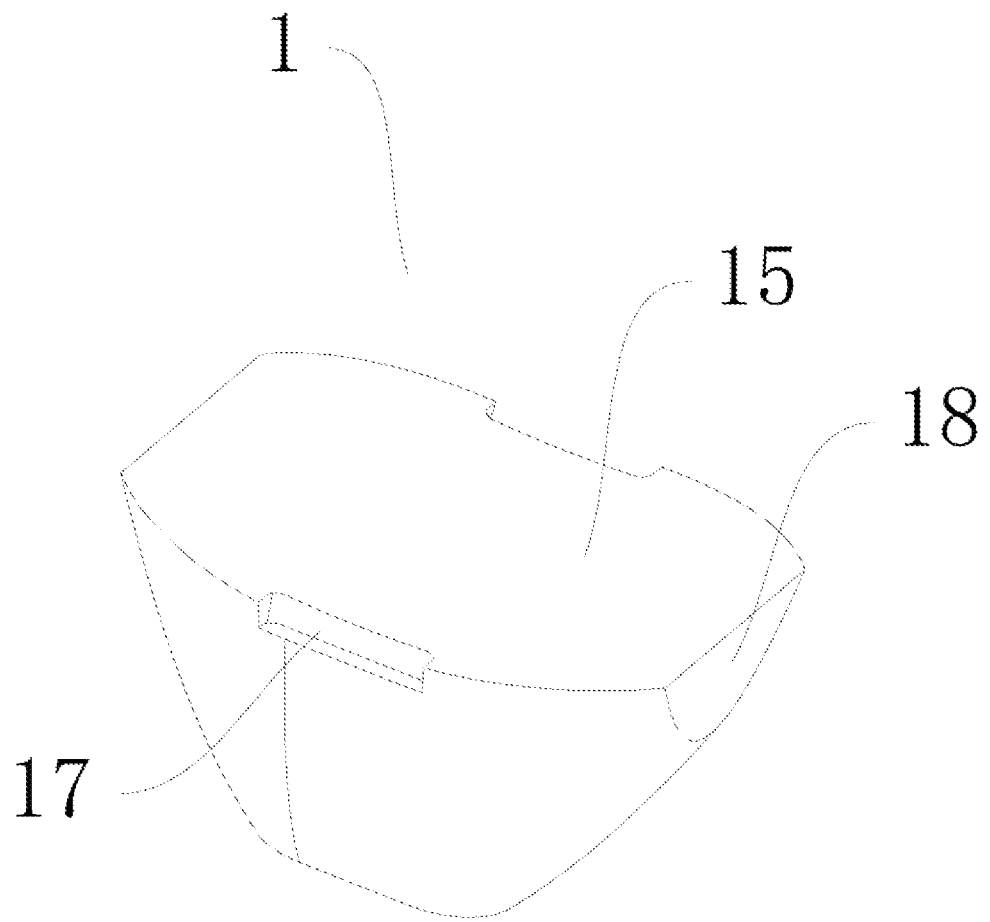
FIG. 11 is a perspective view of a lens with a concave smooth surface of a third embodiment.

FIG. 8 is the side cross-sectional view of the lens of this embodiment. It can be seen from the figure that the upper end of the lens body 1 is a horizontal straight line. The upper end of the light source accommodation space 11 is a curve with two sides high and the middle low.

The size of the lens body 1 is 20*19*12 mm. The height of the middle ridge 14 is 0.6 mm and the width is 3 mm. The heights of the side ridges 14 are 4.6 mm and 3.3 mm.

Embodiment 3

Referring to FIGS. 11-15, the lens includes a lens body 1. The lens body 1 is substantially in a shape of a circular table. The small end of the lens body 1 is provided with a recessed light source accommodation space 11. The inner surface of the light source accommodation space 11 is a light incident surface, the surface of the large end of the lens body 1 is an exit surface, and the side surface of the lens body 1 is a reflective surface. The bottom of the light source accommodation space 11 is provided with a cylindrical protrusion 12. And the cross section dimension of the light source accommodation the space 11 gradually decreases from the small end to the big end.

The difference from the first embodiment is that the spherical protrusions 13 are eliminated disposed at both ends of the cylindrical protrusion 12. The surface of the large end of the lens body 1 is a concave inner smooth surface 15, which matches with the incident surface and the reflective surface of the lens. The light emitted from the exits surface of the lens can reach an illumination angle of 20*40 degrees, i.e., an illumination range of 20 degrees up and down and 40 degrees left and right can be achieved.

Figure 12:
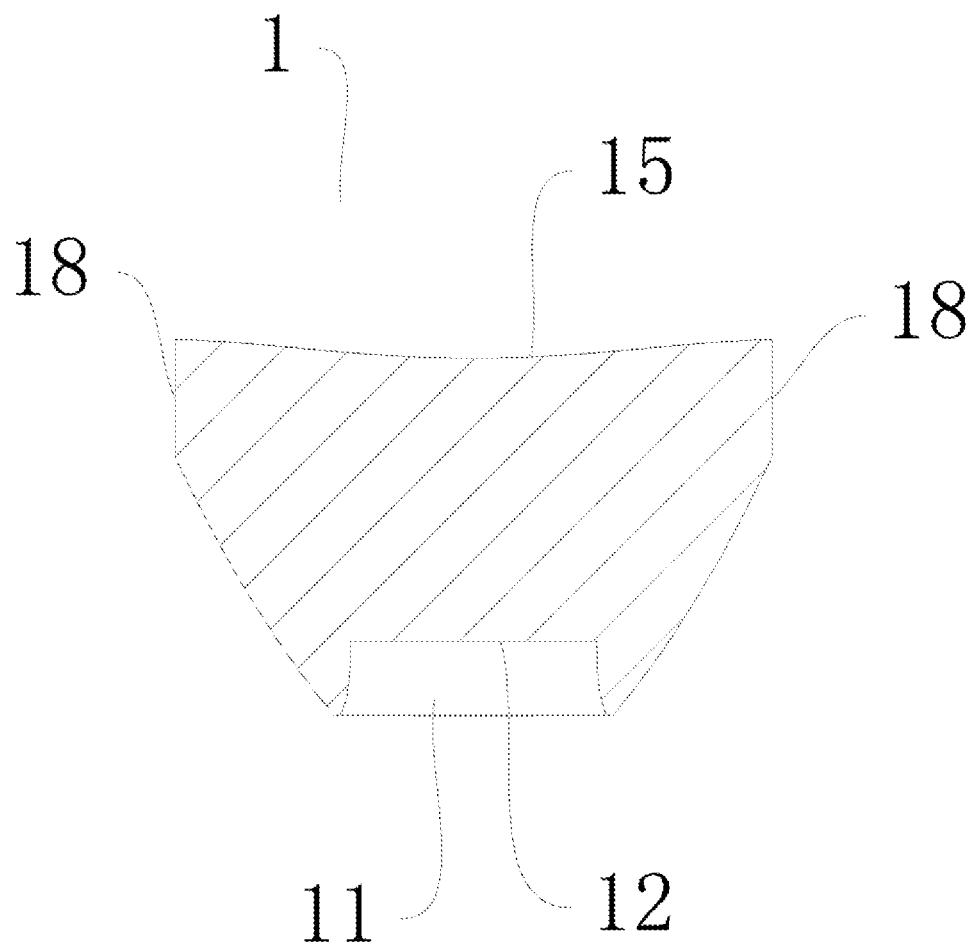
FIG. 12 is a front sectional view of a lens with a concave smooth surface of the third embodiment.
Figure 13:
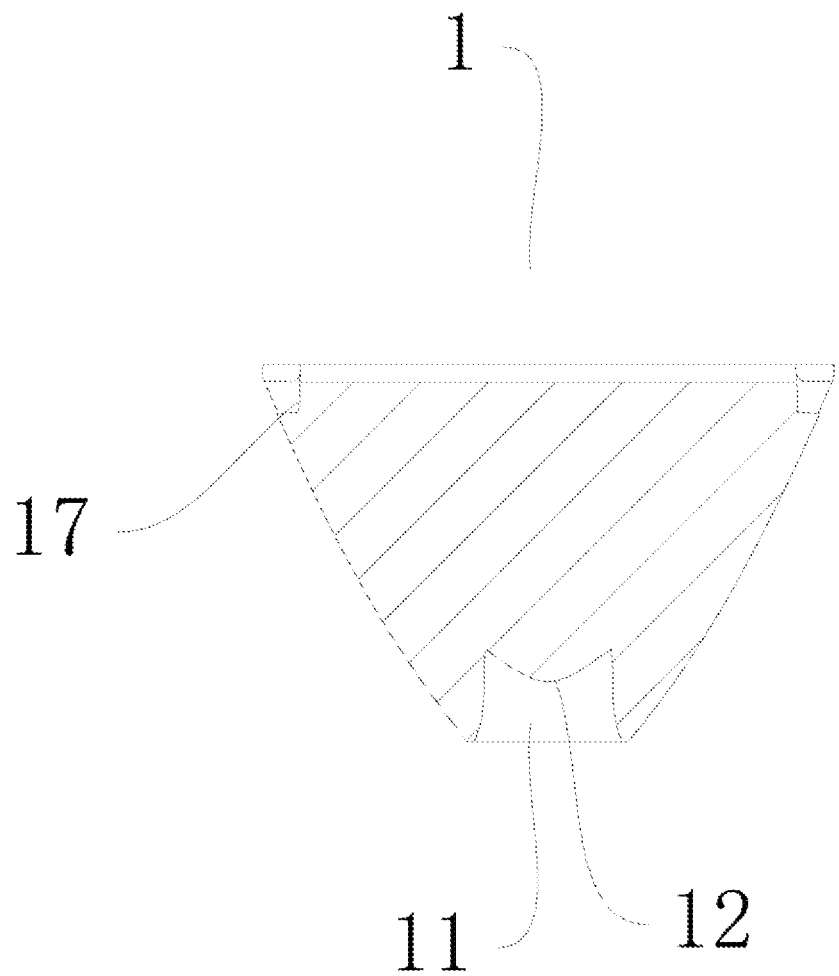
FIG. 13 is a side sectional view of a lens with a concave smooth surface of the third embodiment.
Figure 14:
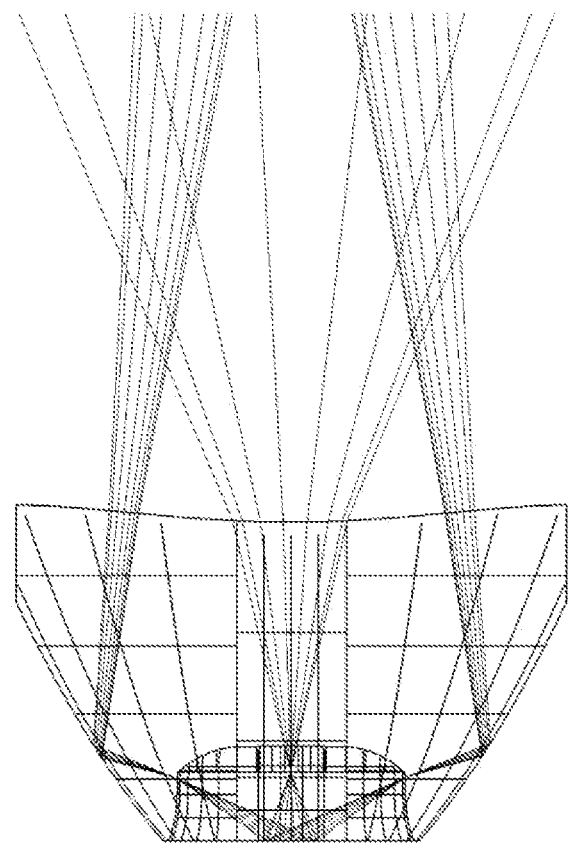
FIG. 14 is a front light path diagram of a lens with a concave smooth surface of the third embodiment.
Figure 15:
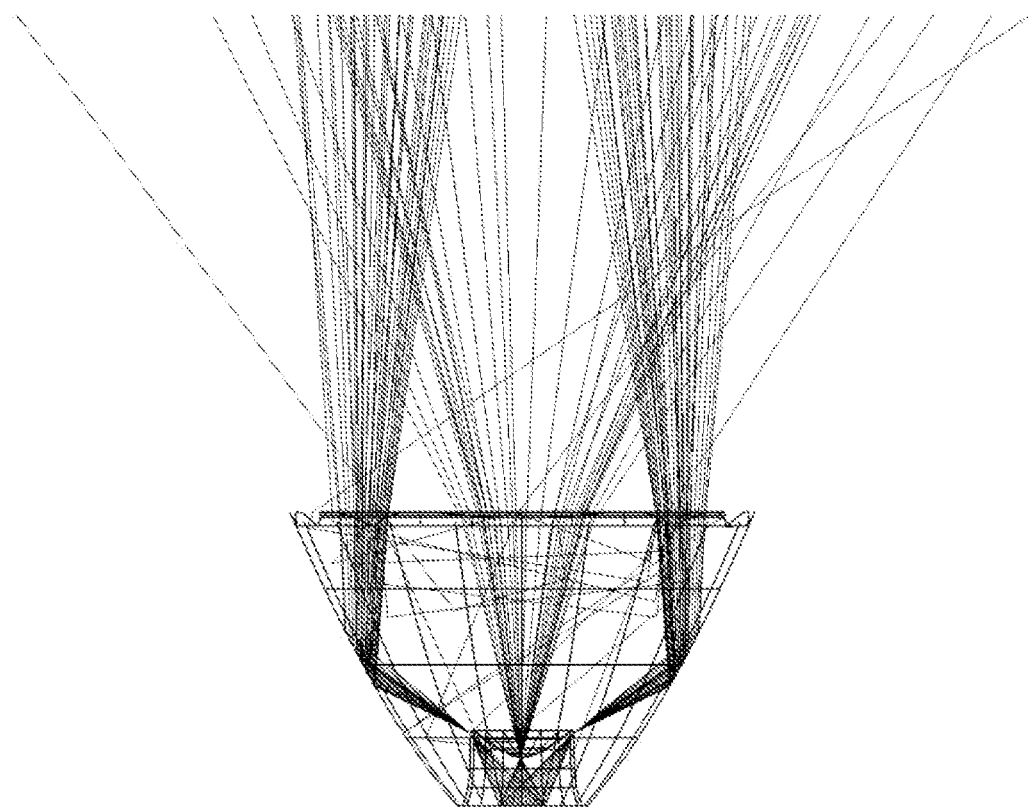
FIG. 15 is a side light path diagram of a lens with a concave smooth surface of the third embodiment.

FIG. 12 is the front sectional view of the lens of the present embodiment, it can be seen that the upper end of the lens body 1, i.e., the large end is a concave inner curve with two sides high and middle low. The upper end of the light source accommodation space 11 is a horizontal straight line.

FIG. 1 is the side cross-sectional view of the lens of this embodiment. It can be seen that the upper end of the lens body 1 i.e., the large end is a horizontal straight line, and the upper end of the light source accommodation space 11 is a curve with two sides of high and middle low.

The size of the lens body 1 is 20*19*12 mm, the height of the ridges 14 is 0.6 mm, the width is 3 mm. The height of the clamp slot 17 is 1 mm, the width is 6 mm, and the volume is small.

Embodiment 4

Figure 16:
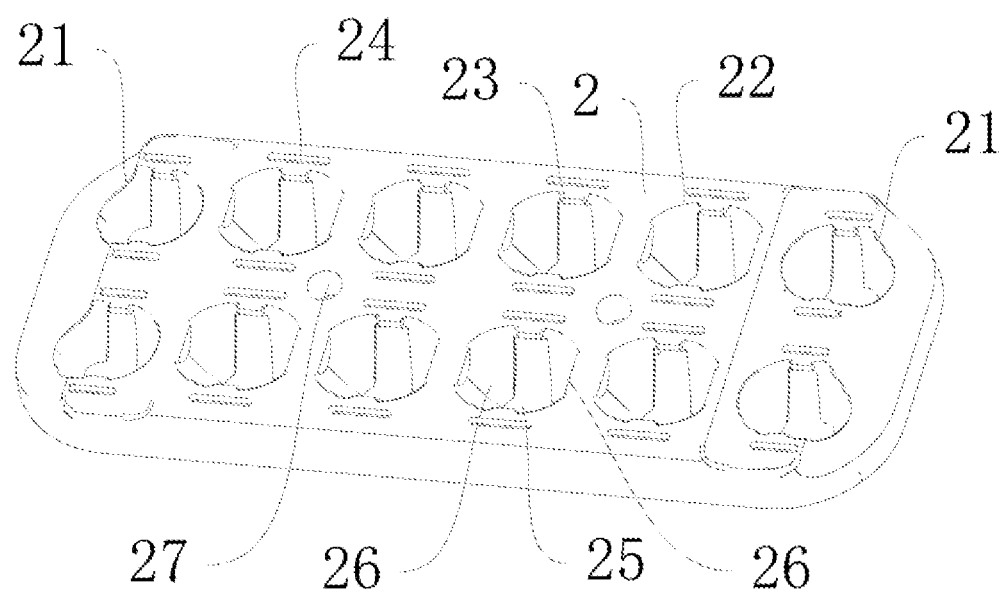
FIG. 16 is a schematic structural view of a lens holder of a fourth embodiment.

Referring to FIG. 16, the lens and lens holder component includes a lens holder and lenses. The lenses are lenses described in embodiments 1, 2, and 3. The lens holder includes an elastically deformable frame body 2. An accommodation cavity for accommodating the lens is disposed on the frame body 2. A clamp block 23 which matches with the clamp slot 17 is disposed at the two opposite sidewalls of the accommodation cavity, near the opening. The clamp block 23 can be elastically extended and retracted to the inner wall of the accommodation cavity. The bottom of the accommodation cavity is provided with a perforation 25 through which the small end of the lens passes.

The lens body 1 is mounted in the accommodation cavity, and the upper part is matched up to clamp with the clamp slot 17 through the clamp block 23 to prevent the lens body 1 from falling out of the accommodation cavity. It eliminates the cover plate of the conventional fixed lens, simplifies the structure, reduces the cost, and makes it convenient to disassemble and assemble. The small end of the lens body 1 protrudes through the perforation 25 of the accommodation cavity to facilitate abutment with the lamp plate 33. And the large end of the lens body 1 is champed with the clamp block 23, thereby realizing the lock of the lens body 1 in the vertical direction, and improving the installation stability of the lens body 1, eliminating abnormal noises. The clamp block 23 can be elastically extended and retracted into the inner wall of the accommodation cavity to facilitate disassembly and assembly of the lens body 1. In addition, a plurality of lens bodies 1 with the same outer contour can be disposed in the accommodation cavity so as to reduce manufacturing costs, and provide strong adaptability. The same holder can be mounted with different optical properties of the lens body 1.

Furthermore, a deformation slot 24 is disposed on the frame body 2, near the clamp block 23, along the deformation direction of the clamp block 23. The disposition of the deformation slot 24 increases the elastic expansion and contraction capability of the clamp block 23. Specifically, when lens is mounted, the clamp block 23 is subjected to lateral pressure of the lens side in the process of downward movement of the lens in the accommodation cavity. The disposition of the deformation slot 24 makes the clamp block 23 be more easily deformed laterally. When the clamp slot 17 of the lens and the clamp block are on the same horizontal level, the clamp block no longer receives the pressing force from the side of the lens. Under the action of the restoring force, the clamp block deforms laterally to return to the initial position and clamps with the clamp slot.

Furthermore, the accommodation cavity is formed by at least two bracket plates 26 that are spaced apart and match the profile of the side wall of the lens body 1. The disposition of the racket plate 26 plays a role in supporting for the side wall of the lens body 1, avoids horizontal shaking of the lens body 1, improves the installation stability of the lens body 1. And it locates the lens body 1 for convenient disassembly and assembly. In addition, the wall thickness of the bracket plate 26 is 1.2 mm, which can play a role in deformation.

During the lens installation, the lens side presses the bracket plate 26 to be deformed and stretched until the clamp block 23 is clamped in the clamp slot 24, in the process of the downward movement of the lens, so that the side of the lens and the large end of the clamp slot 24 are subjected to pressure, thereby improving the installation stability of the lens.

Furthermore, the accommodation cavity includes a first cavity 21 and a second cavity 22. The first cavity 21 is disposed at both ends of the frame body 2 and matches with the stepped notch 16. The second cavity 22 is disposed in the middle of the frame body 2. The first accommodation cavity is mounted with a lens body 1 having a stepped notch 16 and locates at both ends of the frame body 2 of the lens body 1. Light from the lens body 1 can be seen from both sides of the frame body 2 of the lens body 1, so as to reach 180 degrees light range, have a good warning effect.

The frame body 2 is made of ABS material and has strong elastic deformability. The bracket plate 26 and the clamp block 23 are integrally formed with the frame body 2 of the lens body 1, which makes it easy to manufacture and has a low cost.

Embodiment 5

Figure 17:
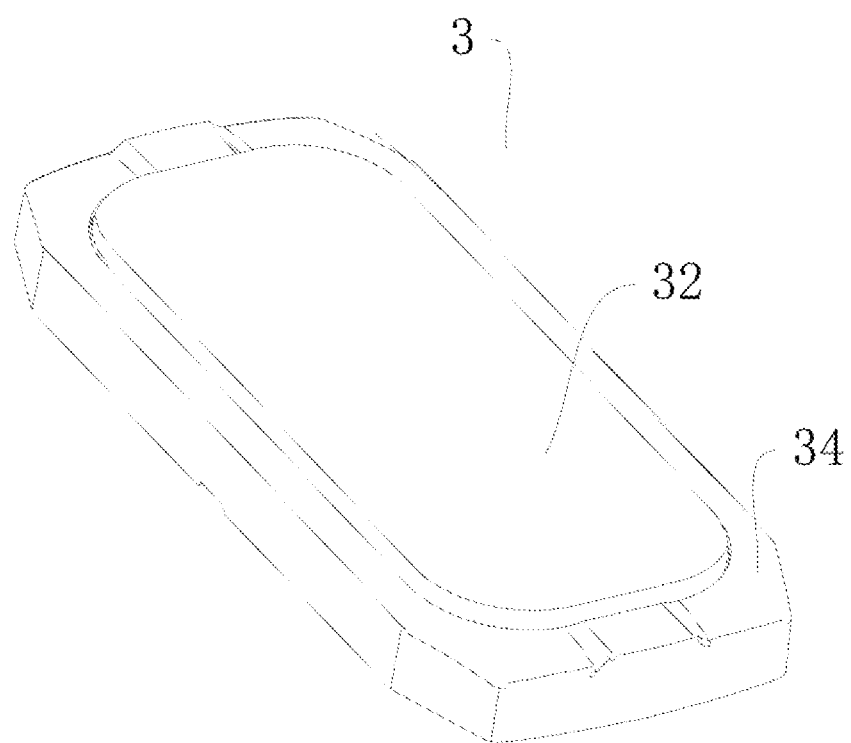
FIG. 17 is an outline view of a strobe lamp of a fifth embodiment.
Figure 18:
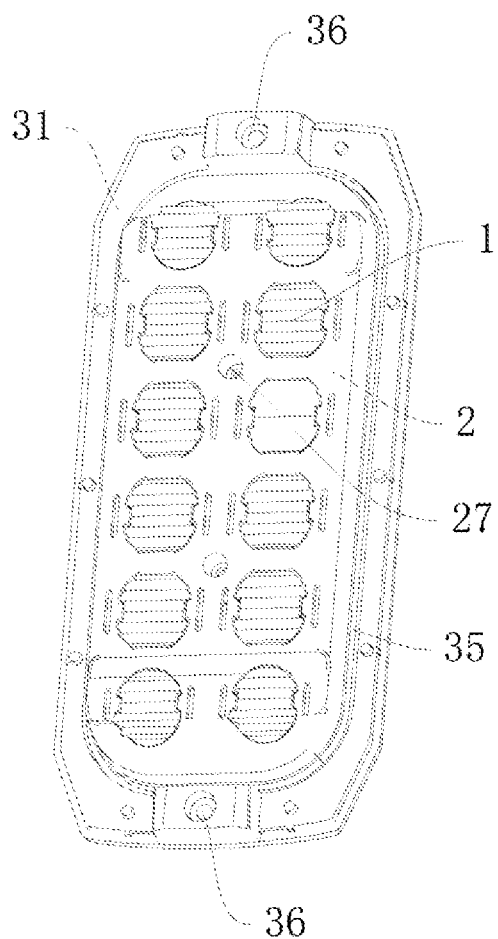
FIG. 18 is a schematic view of installation of a lens, a lens holder, and a base of the fifth embodiment.
Figure 19:
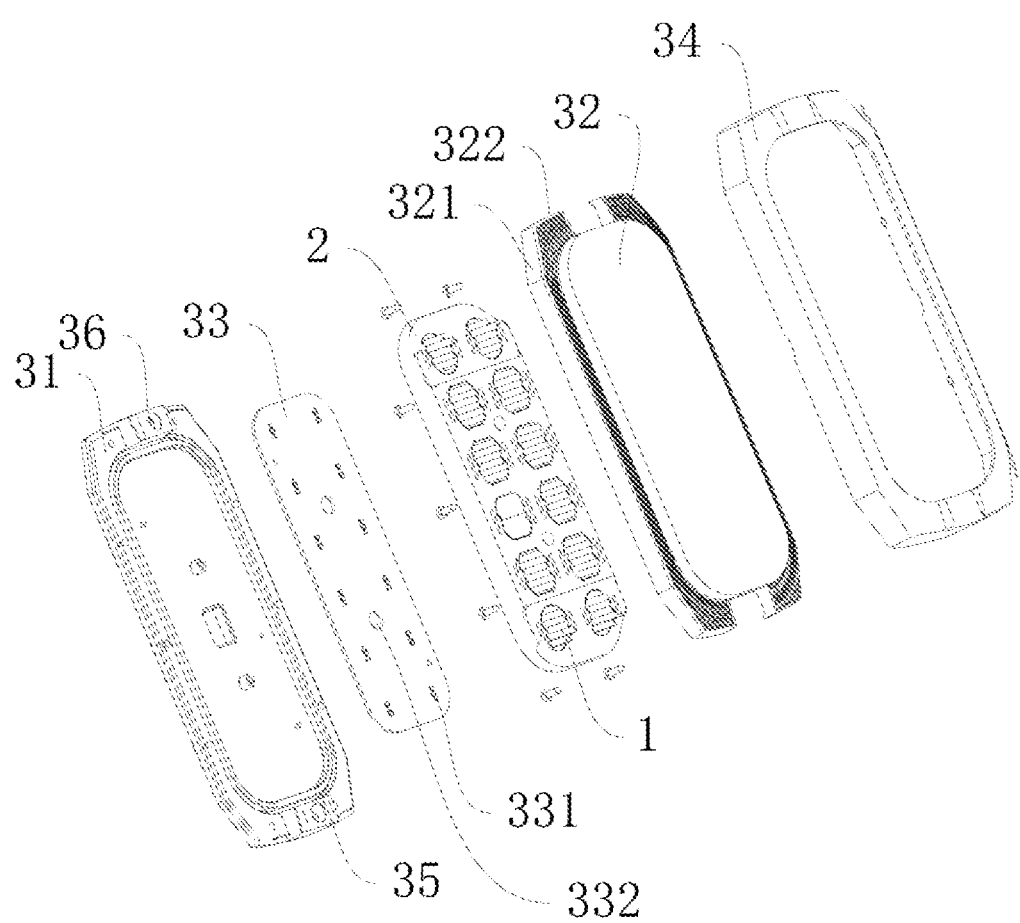
FIG. 19 is an exploded view of the strobe lamp of the fifth embodiment.
Figure 20:
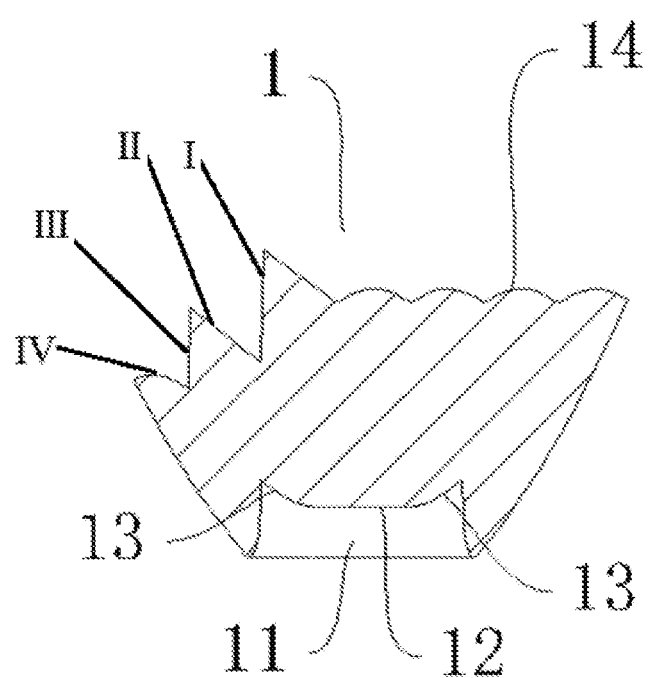
FIG. 20 is the second front sectional view of a lens with a stepped notch of the second embodiment (indicating the names of each plane of the stepped notch).

Referring to FIGS. 17-19, the strobe lamp 3 includes a base 31, a transparent cover 32, and a lamp plate 33 that are fastened together. The strobe lamp 3 further includes the lens and lens holder component in the fourth embodiment. The lamp plate 33 is fixed on the light on the base 31, the frame body 2 is fastened on the lamp plate 33 with a fastener. The transparent cover 32 is covered on the periphery of the frame body 2.

The strobe lamp 3 adopts the frame body 2, which can be installed with different optical performance lenses to achieve different illumination effects so as to meet different illumination standards. It has a good adaptability, simplifies the structure, has a low cost, and is convenient to assemble and disassemble. Matching with the lamp plate 33, it can achieve multiple functions, such as alerting, lighting, and automotive STT functionality.

Screw holes 36 are disposed at both ends of the base 31 and can be directly fixed on the vehicle with screws, eliminating the need for fixing brackets. Chrome-plated decorative parts 34 are disposed on the periphery of the base 31, and the screw holes 36 are covered. It is aesthetically pleasing. And a sealing slot 35 is disposed on the base 31 for mounting sealing ring. Via holes are disposed for fixing the lamp plate 33 on the bottom plate outside the enclosed area of the sealing slot 35 so that the sealing effect is good, and saves the design cost for sealing separate via hole.

A mounting hole 27 is disposed on the frame body 2, and a via hole 332 aligned with the mounting hole 27 is disposed on the lamp plate 33. The lamp plate 33 and the frame body 2 are fixed on the base 31 by screws. The lamp plate 33 locates between the base 31 and the frame body 2. The structure is simple, and it is convenient to assemble and disassemble. The lamp bead 331 is disposed on the lamp plate 33, and the light source accommodation space 11 of each lens accommodates three lamp beads 331 arranged side by side. And the lighting effect is good.

As described above, the present invention can be better implemented.

The invention claimed is:

1. A lens, comprising a lens body (1), the lens body is substantially in a shape of a circular table, a small end of the lens body (1) is provided with a concave inner light source accommodation space (11), the inner surface of the light source accommodation space (11) is an incident surface of light, a surface of a large end of the lens body (1) is an exit surface, and a side surface of the lens body (1) is a reflecting surface, wherein a bottom of the light source accommodation space (11) is provided with a cylindrical protrusion (12), cross section dimension of the light source accommodation space (11) gradually decreases, from the small end of the lens (1) to the large end of the lens (1);

the cylindrical protrusion (12) is formed by protrusion from the bottom of the light source accommodation space (11) toward the small end of the lens body (1).

2. The lens according to claim 1, wherein, the surface of the large end of the lens body (1) is a concave inner smooth surface (15).

3. The lens according to claim 1, wherein, an edge of the large end of the lens body (1) is provided with a clamp slot (17).

4. A lens holder, wherein, comprises an elastically deformable frame body (2); and an accommodation cavity for accommodating the lens of claim 1 is disposed on the frame body (2), and a clamp block (23) clamped with the lens is disposed on the side wall of the accommodation cavity, near to an opening; the clamp block (23) can elastically extend and retract the inner wall of the accommodation cavity, and the bottom of the accommodation cavity is provided with a perforation (25).

5. The lens holder according to claim 4, wherein a deformation slot (24) is disposed on the frame body (2) near the clamp block (23), along in a deformation direction of the clamp block (23).

6. The lens holder according to claim 4, wherein the accommodation cavity is formed by at least two bracket plates (26) disposed apart and matching with profile of sidewall of the lens.

7. The lens holder according to claim 4, wherein the accommodation cavity comprises a first cavity (21) and a second cavity (22), and the first cavity (21) is disposed at both ends of the frame body (2), the second cavity (22) is disposed in middle of the frame body (2).

8. The lens holder according to claim 4, wherein the accommodation cavity is formed by at least two bracket plates (26) that are disposed apart and are gradually matched with a profile of sidewall of the lens; the gradual matching means that the profile of sidewall of the lens is completely in contact with the bracket plates at bottom near the small end of the lens body, and there is a gap in upper part near the large end of the lens body.

9. The lens according to claim 1, wherein a spherical protrusion (13) is symmetrically disposed at both ends of the cylindrical protrusion (12) in the axial direction, and the surface of cylindrical protrusion (12) is transitionally connected with the surface of the spherical projection (13).

10. The lens according to claim 9, wherein, a surface of the large end of the lens body (1) is provided with a ridge (14).

11. The lens according to claim 10, wherein, a stepped notch (16) is disposed between one side of the large end of the lens body (1) and the side of the lens body (1); the stepped notch is formed by invagination from the outside of the lens to the solid part of the lens, and comprises a continuous first plane, a second plane, a third plane and a fourth plane; and the first plane, the second plane, the third plane, and the fourth plane are disposed in a direction from the surface of the large end of the lens body (1) to the side of the lens body (1) in sequence; the first plane intersects the second plane to form a first notch; the third plane intersects the fourth plane to form a second notch; the first notch and the second notch constitute the stepped notch; the first plane is perpendicular or nearly perpendicular to the surface of the large end of the lens.

12. A lens and lens holder component, wherein, comprising a lens holder and a lens, the lens comprising a lens body (1), the lens body (1) being substantially in a shape of a circular table, and the small end of the lens body (1) is provided with a concave inner light source accommodation space (11), the inner surface of the light source accommodation space (11) is an incident surface of light, the surface of the large end of the lens body (1) is an exit surface, the side of the lens body (1) is a reflective surface, and bottom of the light source accommodation space (11) is provided with a cylindrical protrusion (12); cross section dimension of the light source accommodation space (11) gradually decreases from the small end of the lens body (1) to the large end of the lens body (1), and an edge of large end of the lens body (1) is provided with a clamp slot (17); the lens holder comprises an elastically deformable frame body (2), and an accommodation cavity for accommodating the lens is disposed on the frame body (2), and the side wall of the accommodation cavity near an opening is provided with a clamp block (23) which clamps with the clamp slot (17), the clamp block (23) can be elastically extended and retracted into the inner wall of the accommodation cavity, and the bottom of the accommodation cavity is provided with a perforation (25) to pass through the small end of the lens body (1).

13. The lens and the lens holder component according to claim 12, wherein a deformation slot (24) is disposed on the frame body (2) along deformation direction of the clamp block (23) and adjacent to the clamp block (23).

14. The lens and the lens holder component according to claim 12, wherein a stepped notch (16) is disposed between one side of the large end of the lens body (1) and the side of the lens body (1); the accommodation cavity comprises a first cavity (21) and a second cavity (22); the first cavity (21) is disposed at both ends of the frame body (2) and matches with the stepped notch (16), the second cavity (22) is disposed in middle of the frame body (2).

15. A strobe lamp comprising a base (31), a transparent cover (32) and a lamp plate (33) which are fastened together, wherein the strobe lamp further comprises the lens and the lens holder component according to claim 12, the lamp plate (33) locates between the base (31) and the frame body (2), and the frame body (2) and the lamp plate (33) are fastened to the base (31) with fasteners, bottom of the lens body (1) abuts on the lamp plate (33), and the transparent cover (32) is covered on periphery of the frame body (2).

* * * * *